May 24, 1927.
H. W. WEST
1,629,897
BRAKE OPERATED CIRCUIT CLOSER
Filed April 9, 1924
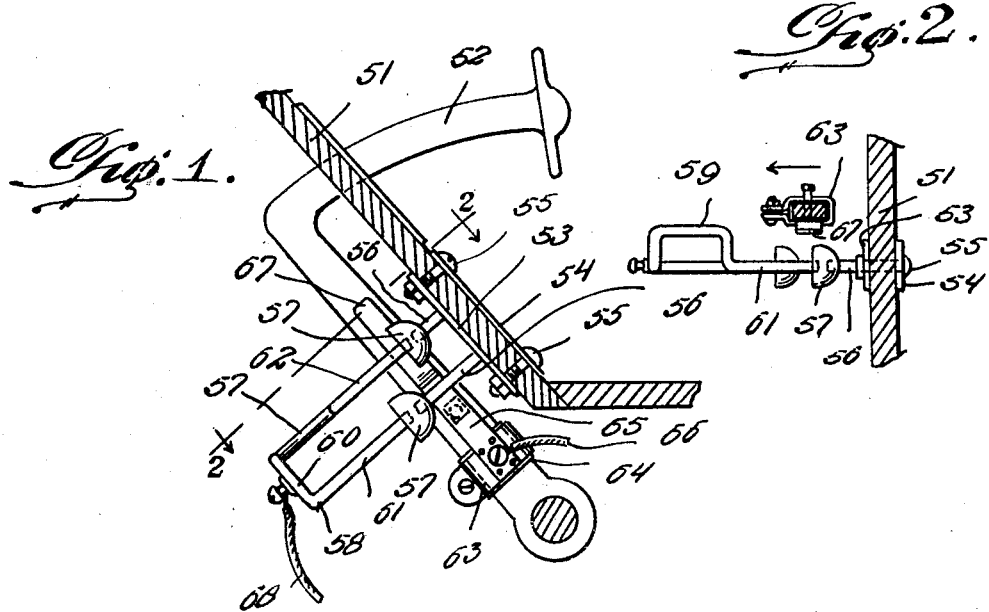
Herbert W. West,
Inventor
By Clarence A. O'Brien
Attorney Patented May 24, 1927.

1,629,897

UNITED STATES PATENT OFFICE.

HERBERT WARRINGTON WEST, OF ROANOKE, VIRGINIA.

BRAKE-OPERATED CIRCUIT CLOSER.

Application filed April 9, 1924. Serial No. 705,284.

The object of the invention resides in providing co-operating contact members carried by the brake pedal in the floor board of the vehicle adapted for cooperation to close a circuit through a stop signal carried by the casing when the brake pedal is operated to apply the brakes of the vehicle and stop the same.

In the drawings forming a part of this application—

Figure 1 is a vertical sectional view through a portion of an automobile, showing the floor board and the position of the brake pedal which is equipped with my special contact device.

Figure 2 is a detail view of the structure shown in Figure 1 taken on line 2—2 of Figure 1.

The floor board of a motor vehicle is indicated at 51 and the usual brake pedal is indicated at 52 extending through the floor board 51 and operable in the well known manner for applying the brakes of a vehicle. A plate 53 is mounted on the under-side of the floor board 51 while a plate 54 is mounted on the opposite side thereof, which plate receives suitable bolts 55 having co-operating nuts for threaded connection therewith whereby the plates 53 and 54 are secured to the floor boards at opposite sides thereof. The plate 53 carries a pair of projecting rods 56 of unequal lengths on the ends of which are mounted insulators 57. A suitable form of contact member indicated generally at 58 is formed of a single piece of copper rod bent to provide an enlongated contact portion 59, a terminal receiving portion 60 connected thereto, while the end portions extend in parallel spaced relation as indicated at 61 and 62, respectively, and are connected with the insulators 57 on which said contact member is mounted in insulated relation from the body of the vehicle. A suitable collar indicated at 63 is mounted on the shank of the foot pedal for removable engagement therewith and insulated therefrom by an insulating collar 64, while an elongated resilient contact member 65 has one end mounted thereon and electrically connected by wires 66 with a "stop" light circuit (not shown), while the other end thereof is off-set as indicated at 67 for sliding co-operation and engagement with the contact portion 59 of the contact member in order to close the circuit to the stop light and illuminate the same for displaying the proper signal when the brake is applied for stopping the automobile. A suitable wire connection 68 extends from the contact member 58.

What is claimed is:—

A foot pedal operated circuit closer comprising a plate mounted adjacent the foot pedal and having a pair of projections of unequal length, a pair of insulators one mounted on the extremity of each projection, a contact member of substantial U-shaped formation having one leg longer than the other and having its extremities fixed to said insulators, the longer leg of the U-shaped contact member being bent outwardly in a substantially U-shaped formation, and a contact member mounted on the shank of the brake pedal having an offset portion adapted to slidably engage the bent outwardly portion of the longer leg of the substantially U-shaped contact member.

In testimony whereof I affix my signature.

HERBERT W. WEST.